US009979346B2

(12) United States Patent
Song et al.

(10) Patent No.: US 9,979,346 B2
(45) Date of Patent: May 22, 2018

(54) TRACKING-TYPE PHOTOVOLTAIC GENERATOR

(71) Applicant: PARU CO., LTD., Jeollanam-do (KR)

(72) Inventors: Kuem Seok Song, Jeollanam-do (KR); Moon Sig Kang, Jeollanam-do (KR)

(73) Assignee: PARU CO., LTD., Jeollanam-Do (KR)

( * ) Notice: Subject to any disclaimer, the term of this patent is extended or adjusted under 35 U.S.C. 154(b) by 0 days. days.

(21) Appl. No.: 14/398,458

(22) PCT Filed: May 9, 2013

(86) PCT No.: PCT/KR2013/004080
§ 371 (c)(1),
(2) Date: Nov. 1, 2014

(87) PCT Pub. No.: WO2013/172594
PCT Pub. Date: Nov. 21, 2013

(65) Prior Publication Data
US 2015/0090316 A1   Apr. 2, 2015

(30) Foreign Application Priority Data
May 14, 2012   (KR) ........................ 10-2012-0050926

(51) Int. Cl.
*H02S 20/32* (2014.01)
*F24J 2/38* (2014.01)
*F24J 2/54* (2006.01)
*F24J 2/52* (2006.01)

(52) U.S. Cl.
CPC ............... *H02S 20/32* (2014.12); *F24J 2/38* (2013.01); *F24J 2/541* (2013.01); *F24J 2/523* (2013.01); *F24J 2002/5451* (2013.01); *F24J 2002/5468* (2013.01); *F24J 2002/5475* (2013.01); *F24J 2002/5482* (2013.01); *Y02E 10/47* (2013.01)

(58) Field of Classification Search
CPC ......... Y02E 10/50; Y02E 10/47; H02S 20/30; F24J 2/38; F24J 2/54; F24J 2/541; F24J 2/523; F24J 2002/5482; F24J 2002/5479; F24J 2002/5468; F24J 2002/5451; F24J 2002/5475
USPC ................ 136/246; 250/203.4; 126/573, 576
See application file for complete search history.

(56) References Cited

U.S. PATENT DOCUMENTS 6,058,930 A * 5/2000 Shingleton ............... F24J 2/541
126/600

FOREIGN PATENT DOCUMENTS

| KR | 10-2009-0108261 A | 10/2009 |
|---|---|---|
| KR | 1020090108261 | * 10/2009 |
| KR | 10-2010-0118347 A | 11/2010 |
| KR | 10-1022987 B1 | 3/2011 |

(Continued)

OTHER PUBLICATIONS

International Search Report for PCT/KR2013/004080.

*Primary Examiner* — Matthew T Martin
*Assistant Examiner* — Dujuan A Horton
(74) *Attorney, Agent, or Firm* — The PL Law Group, PLLC

(57) ABSTRACT

The present invention relates to a tracking-type photovoltaic generator. More particularly, the present invention relates to a tracking-type photovoltaic generator in which multiple solar modules are aligned into one or more rows so as to form a group, and the solar modules of the group aligned in the same row may rotate according to the location of the sun by means of the operation of a linear actuator.

10 Claims, 11 Drawing Sheets

(56) References Cited

FOREIGN PATENT DOCUMENTS

KR         101022987     *    3/2011
KR    10-2011-0100045 A     9/2011

* cited by examiner

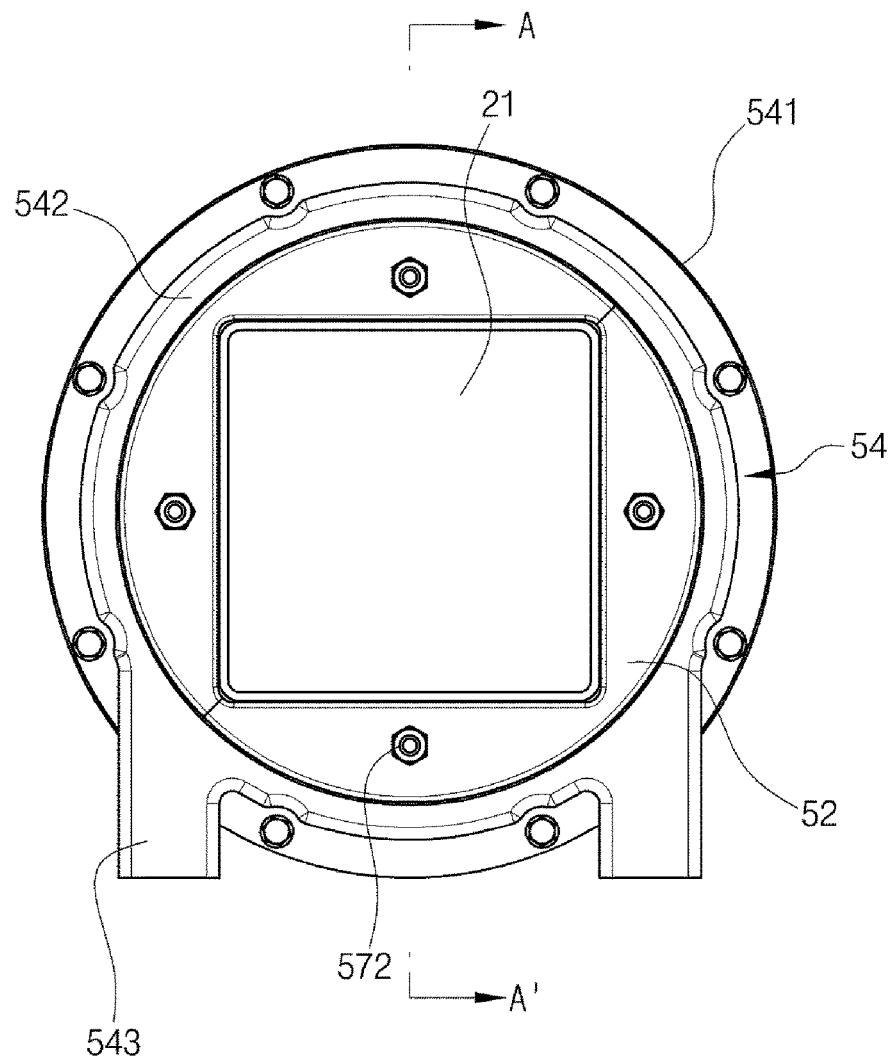

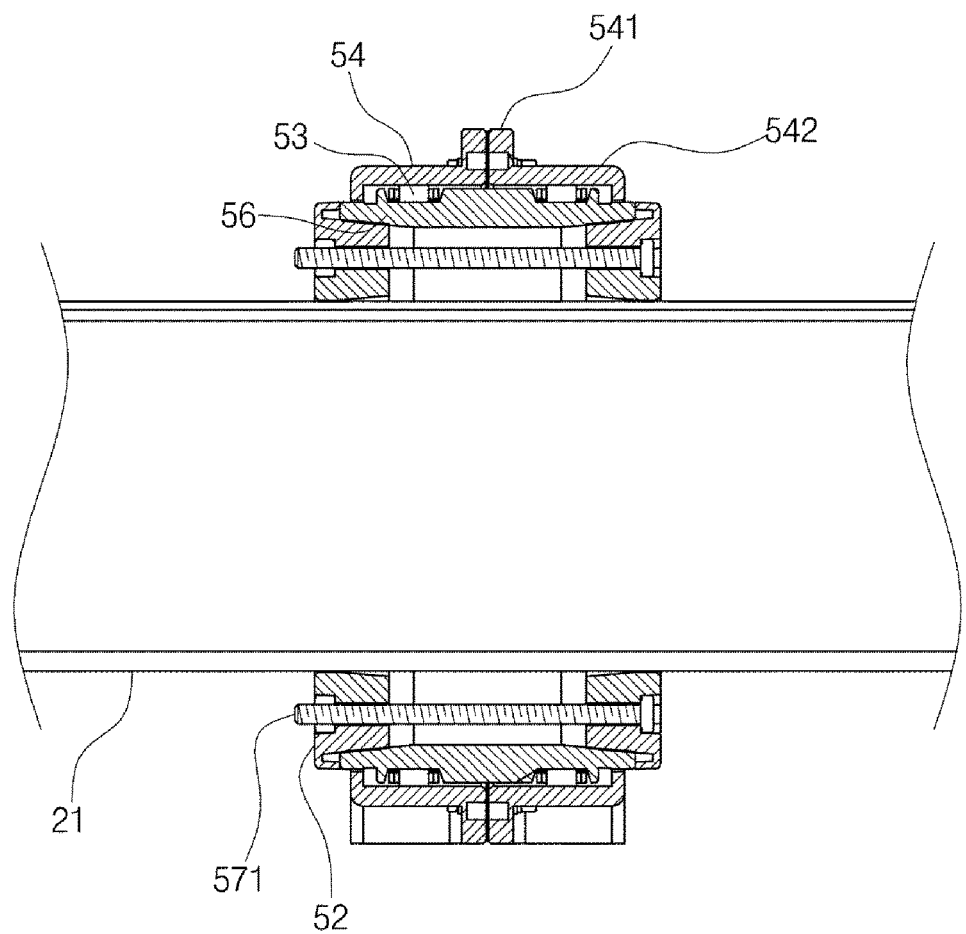

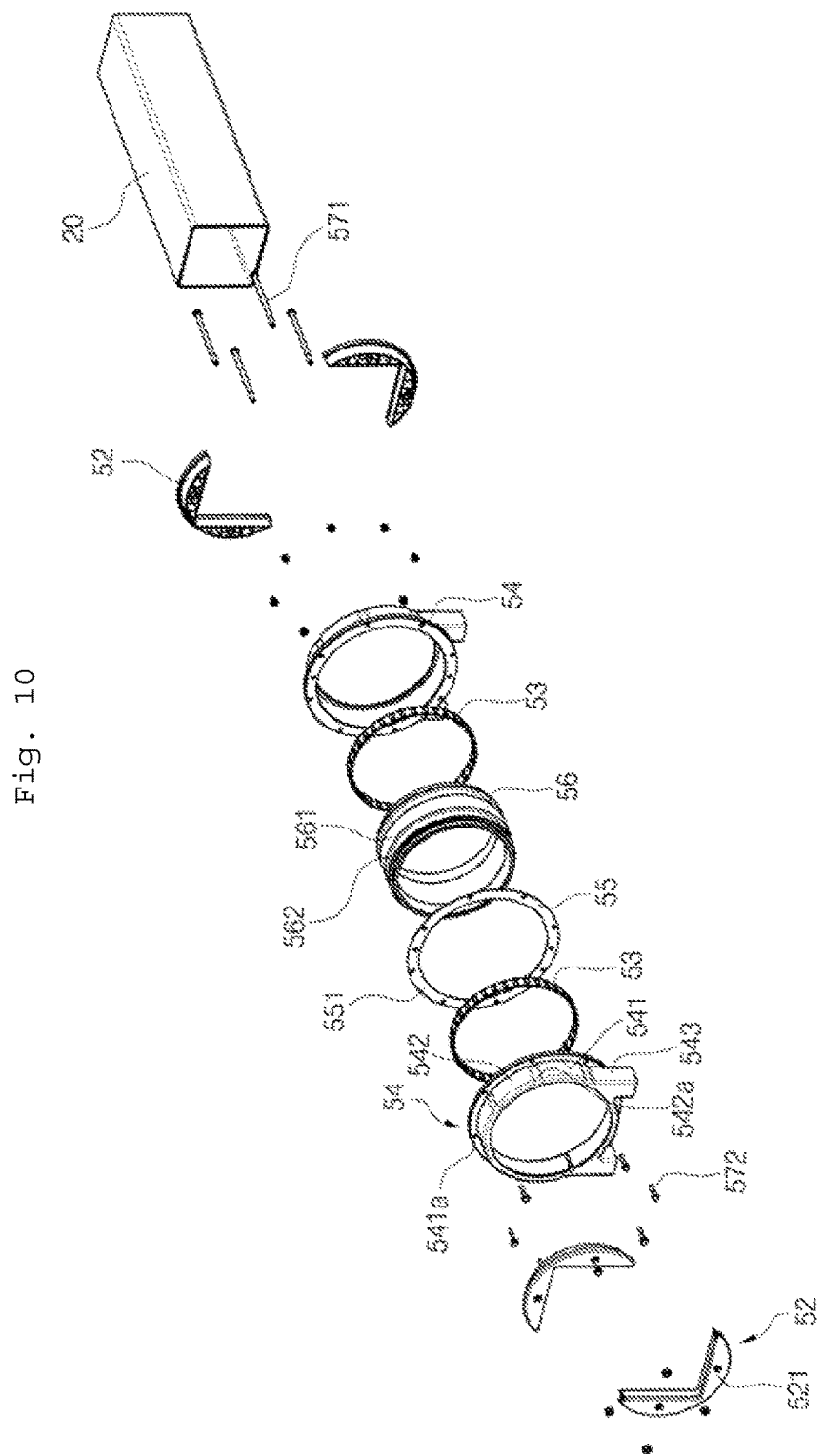

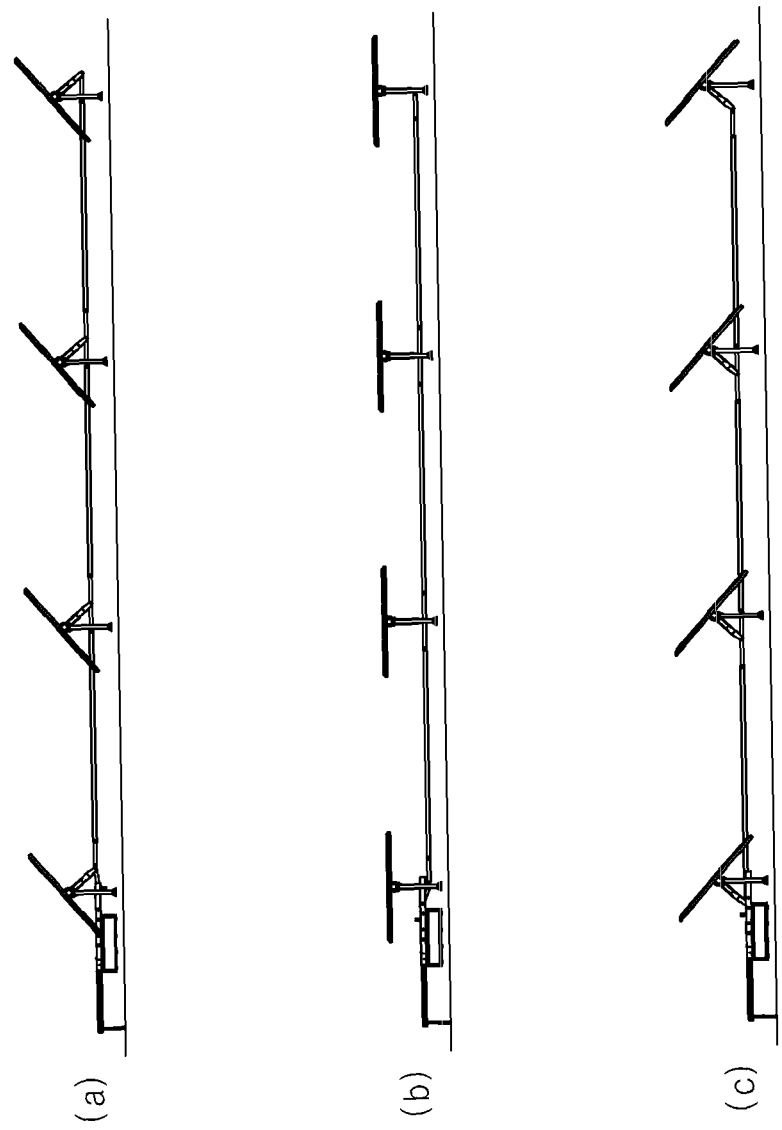

TRACKING-TYPE PHOTOVOLTAIC GENERATOR

TECHNICAL FIELD

The present invention relates, in general, to tracking photovoltaic generators and, more particularly, to a tracking photovoltaic generator in which a plurality of solar modules are arranged in one or more rows to form groups of solar modules, and the groups of arranged solar modules can be rotated according to the location of the sun by operation of a linear actuator.

BACKGROUND ART

In conventional single-shaft solar trackers, a plurality of posts for supporting solar modules are installed upright on the ground. Rotatably supported by the posts, a single rotating shaft is provided. The solar modules are integrally supported on an upper end of the rotating shaft.

The solar modules are provided parallel to the ground. A controller rotates the rotating shaft relative to the posts and makes the solar modules face the sun from sunrise to sunset so that the light of the sun enter the solar modules at an angle as close to perpendicular to the solar modules as possible.

However, for the solar modules provided parallel to the ground, although the angle of incidence at which the light of the sun enters the solar modules is relatively close to the desired 90 degree angle in summer, the altitude of the sun in winter is lower than that in summer and the angle of incidence of the sun light is thus significantly far from the desired 90 degree angle, therefore the efficiency of photovoltaic power generation is markedly reduced.

Typically, one or more solar modules are provided in the form of a group; although the number of solar modules is determined depending on a required amount of electricity. Here, a device for varying the orientation of a large, medium or small-sized group of solar modules according to the location of the sun is required.

SUMMARY

In a conventional tracking photovoltaic generator, to vary the orientation of solar modules according to the time-based location of the sun, motors for operating rotating shafts of the solar modules are provided for the respective solar modules. The controller controls tracking of the solar modules in each group in a centrally controlled manner.

However, a conventional tracking photovoltaic generator is problematic in that the production and installation costs are increased because a motor is required for each solar module.

Accordingly, the present invention has been made keeping in mind the above problems occurring in the prior art, and an object of the present invention is to provide a tracking photovoltaic generator in which a plurality of solar modules are arranged in one or more rows to form one or more groups and the groups of arranged solar modules can be rotated according to the location of the sun by operation of a linear actuator.

In a tracking photovoltaic generator according to the present invention, a plurality of solar modules are arranged in one or more rows to form one or more groups of solar modules, and the arranged solar modules are rotated by operation of a linear actuator according to the location of the sun. In the present invention, the multiple groups of solar modules can be rotated or stopped at the same time by a simple method, whereby the production cost of the generator can be markedly reduced.

DESCRIPTION OF DRAWINGS

FIG. 8 is a front view showing the rotating unit of the tracking photovoltaic generator according to the present invention;

FIG. 9 is a sectional view taken along link A-A' of the rotating unit of the tracking photovoltaic generator according to the present invention;

FIG. 10 is an exploded perspective view of the rotating unit of the tracking photovoltaic generator according to the present invention; and FIG. 11 is a side view illustrating the operation of the tracking photovoltaic generator according to the present invention.

DETAILED DESCRIPTION

Figure 1:
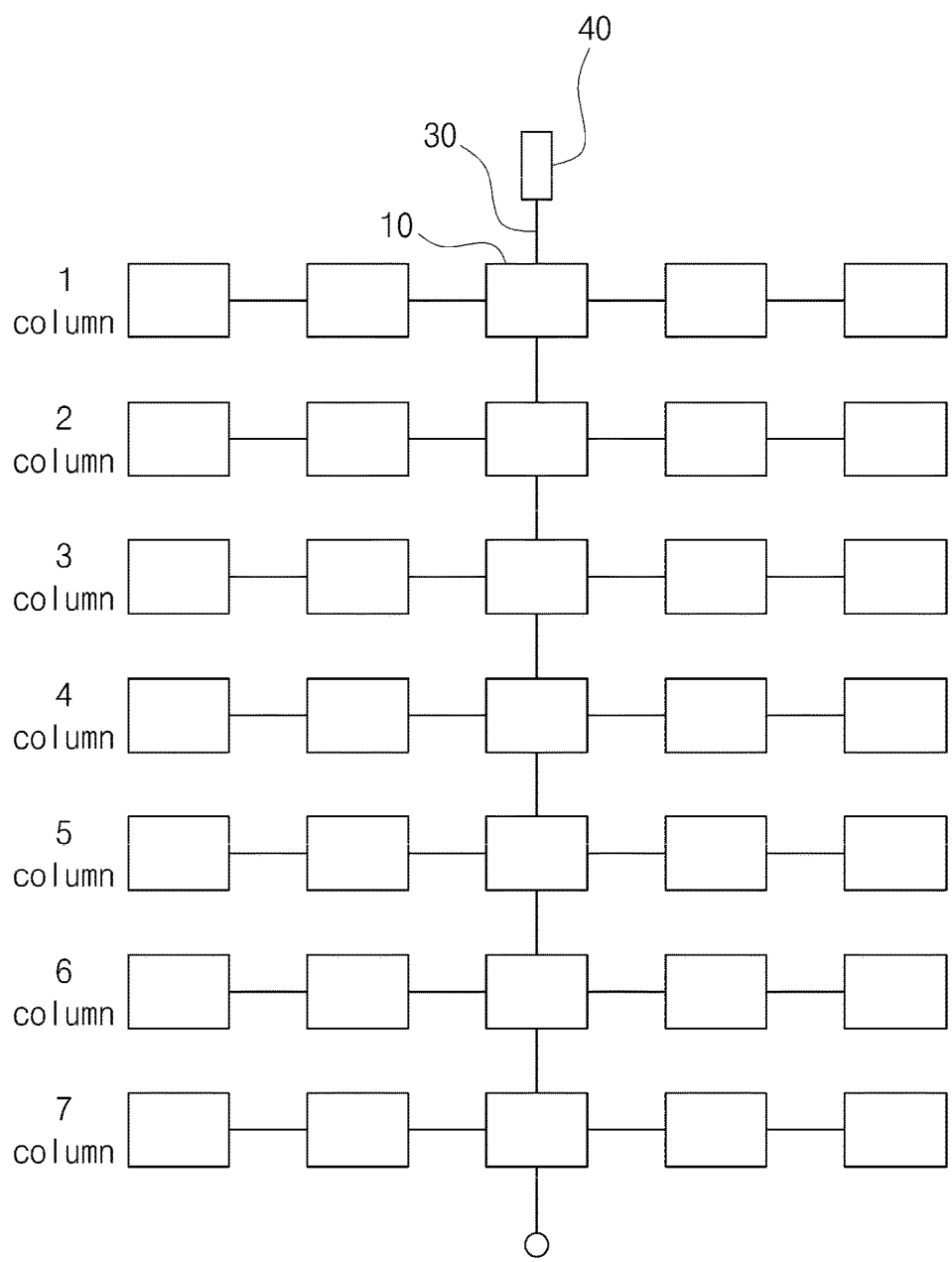
FIG. 1 is a plan view illustrating a tracking photovoltaic generator according to the present invention.

In a first embodiment of the present invention, a tracking photovoltaic generator includes: a drive unit outputting linear kinetic energy by operation of a linear actuator; one or more solar modules converting solar energy into electric energy and outputting the electric energy; one or more cell supports arranged in longitudinal and lateral directions, the cell supports rotatably supporting the solar modules; and a connection bar extending in the longitudinal direction and configured such that the one or more cell supports are rotatably connected to the connection bar, the connection bar being moved forward or backward by operation of the drive unit so that the one or more cell supports are rotated forward or backward, wherein the cell supports include turning shafts extending in the lateral direction, each of the turning shaft connecting the corresponding cell supports, arranged in the lateral direction, to each other, and when the connection bar rotates forward or backward, the turning shafts rotates and transmits rotating force to the corresponding cell supports so that the cell supports arranged in the lateral direction and connected to each other are simultaneously rotated.

In a second embodiment of the present invention, the drive unit may include: a cylinder provided on an upper surface of a support table fixed on a ground, the cylinder generating linear drive force; guide rails provided on the upper surface of the support table at positions spaced apart from each other, each of the guide rails comprising horizontal plates respectively provided on upper and lower ends of the guide rail and extending in opposite directions; a bearing block moved by operation of the cylinder, the bearing block comprising one or more rollers making close contact with the upper and lower horizontal plates of the guide rails and rotating along the horizontal plates; and a link bar connected at a first end thereof to the connection bar, the link bar being rotatably coupled at a second end thereof to the bearing block.

In a third embodiment of the present invention, each of the cell supports may include: one or more panel support frames fixed on an upper surface of the turning shaft, the panel support frames supporting the corresponding solar modules; a vertical frame extending form a lower part of the turning shaft; and a turning bracket extending from a lower end of the vertical frame, the turning bracket being rotatably coupled to the connection bar.

In a fourth embodiment of the present invention, the cell support may further include a diagonal frame extending upward from the vertical frame at a predetermined angle of inclination. The diagonal frame may be fixed to the lower surface of the turning shaft.

In a fifth embodiment of the present invention, the connection bar may include first connection bars and second connection bars alternately connected to each other. The first and second connection bars have different diameters.

In a sixth embodiment of the present invention, the connection bar may further include a rotating shaft provided in the connection bar and passing through opposite side surfaces of the connection bar, the rotating shaft rotatably coupling the turning bracket to the connection bar, and the turning bracket may be rotatably coupled at an end thereof to the connection bar by the rotating shaft disposed in a through hole corresponding to the shaft insert member.

In a seventh embodiment of the present invention, the connection bar may further include a shaft insert member provided in the connection bar and configured to be closed at upper and lower sides by surfaces. The shaft insert member may extend to openings formed in the opposite side surfaces of the connection bar so that the rotating shaft is inserted into the shaft insert member.

In an eighth embodiment of the present invention, the tracking photovoltaic generator may further include one or more rotating units provided between the one or more cell supports and coupled to the corresponding turning shafts so that the turning shafts can be rotated.

In a ninth embodiment of the present invention, each of the rotating units may include: a rotator having an opening therein so that the turning shaft is inserted into the rotator, the rotator having an outer surface extending in opposite directions; gaskets seated on the outer surface of the rotator; a pair of rotating bearings disposed on opposite sides of the gaskets and seated on the outer surface of the rotator; coupling plates each having an opening therein so that the turning shaft passes through the coupling plates, the coupling plates being coupled to each other at opposite sides of the rotator based on the gaskets and the rotating bearings; and holding plates respectively coupled to front and rear portions of the coupling plates, each of the holding plates having in a central portion an opening corresponding to an outer shape of the turning shaft.

In a tenth embodiment of the present invention, the rotating unit may further include a support post placed upright on the ground, with an upper planar plate provided on an upper surface of the support post so that the rotating unit is supported on the support post.

In an eleventh embodiment of the present invention, each of the coupling plates may include: a plate body having a shape corresponding to the rotator and having an opening in a central portion thereof; a coupling part extending outward from the plate body, with one or more screw holes formed in the coupling part at positions spaced apart from each other; and one or more grooves formed in an outer surface of the plate body at positions corresponding to the respective screw holes.

In a twelfth embodiment of the present invention, the coupling plate may further include a support part extending downward from the plate body. The support part may be fixed to an upper surface of the support post.

In a thirteenth embodiment of the present invention, the holding plate may be divided into a plurality of parts and fastened to a front surface of the coupling plate.

In a fourteenth embodiment of the present invention, the rotating unit may further include a fastening pin inserted into the holding plates coupled to the respective opposite sides of the rotator so that the holding plates are fastened to each other by the fastening pin.

In a fifteenth embodiment of the present invention, the rotator may have one or more coupling depressions formed in an outer surface of each of opposite sides of the rotating body having the opening therein. The coupling depressions form a stepped portion on which the corresponding gasket and bearing are seated.

Hereinafter, a tracking photovoltaic generator according to a preferred embodiment of the present invention will be described in detail with reference to the attached drawings.

Figure 2:
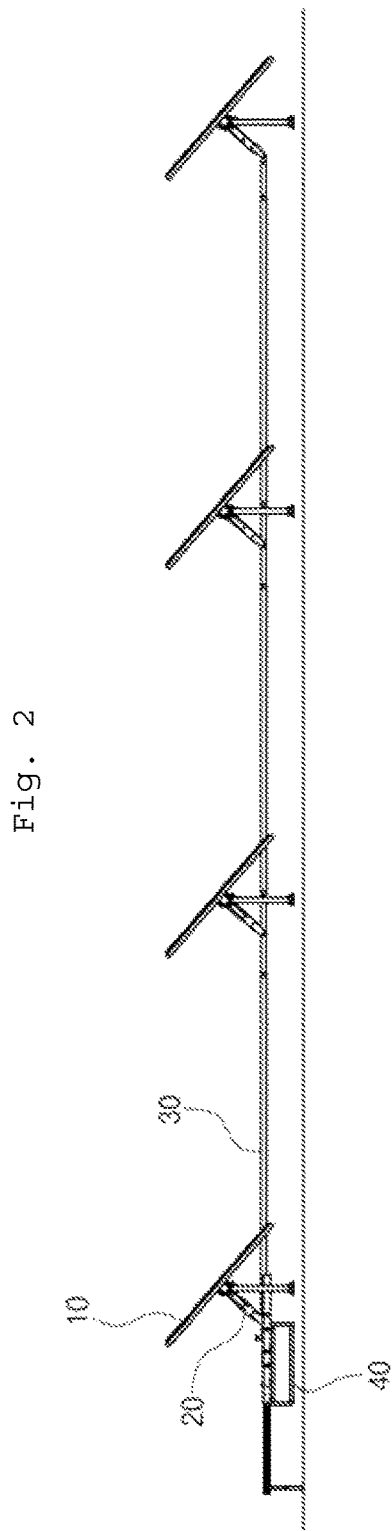
FIG. 2 is a side view illustrating the tracking photovoltaic generator according to the present invention.

FIG. 1 is a plan view illustrating a tracking photovoltaic generator according to the present invention. FIG. 2 is a side view illustrating the tracking photovoltaic generator according to the present invention.

Referring to FIGS. 1 and 2, the tracking photovoltaic generator according to the present invention includes a plurality of solar modules 10 that are arranged in longitudinal and lateral directions and are integrally rotated under the control of a control unit according to the location of the sun.

The solar modules 10 are arranged in the lateral direction (for example, first to seventh rows) and in the longitudinal direction. The tracking photovoltaic generator further includes a drive unit 40 that comprises a linear actuator and generates drive force, a connection bar 30 that is connected to the drive unit 40, and cell supports (20, refer to FIGS. 2 through 7) that supports the solar modules 10.

A plurality of solar modules 10 that are arranged in the lateral direction forms a single group of solar modules. A plurality of groups of solar modules are arranged in the longitudinal direction.

The groups of solar modules 10 are laterally connected to the single connection bar 30 that extends a predetermined length in the longitudinal direction. Therefore, the groups of solar modules 10 can be simultaneously rotated by the connection bar 30 that is moved forward or backward by the operation of the linear actuator of the drive unit 40.

Here, the corresponding solar modules 10 of the solar module groups are connected to the connection bar 30 by the cell supports 20. Therefore, when the connection bar 30 moves forward or backward, the solar modules 10 of the solar module groups are simultaneously rotated.

In more detail, the present invention is configured such that the connection bar 30 is linearly moved by the operation of the actuator of the drive unit 40 and the cell supports 20 that are connected to each other by the connection bar 30 are thus rotated forward or backward. Furthermore, each cell support 20 is connected to other cell supports 20 that are arranged in the lateral direction and configured so as to be rotatable. Hence, if rotating force resulting from the linear movement of the connection bar 30 is transmitted to one cell support 20, the other cell supports 20 that are connected to it in the lateral direction are rotated at the same time. As a result, the solar modules 10 supported on the cell supports 20 are simultaneously rotated.

It stands to reason that the tracking photovoltaic generator according to the present invention includes a sensor (not shown) for tracking the location of the sun, and the control unit (not shown) that controls the drive unit 40 in response to a sensing signal of the sensor. Therefore, these are not shown in the drawings and detailed description thereof will be omitted.

The tracking photovoltaic generator according to the present invention includes the drive unit 40 that uses the actuator and outputs linear drive force, the cell supports 20 that support the respective solar modules 10, a support bar that transmits the drive force of the drive unit to each cell support 20, and a rotating unit 50 that converts the linear movement of the cell support 20 into rotational motion.

The drive unit will be explained in detail with reference to FIGS. 3 and 4.

Figure 3:
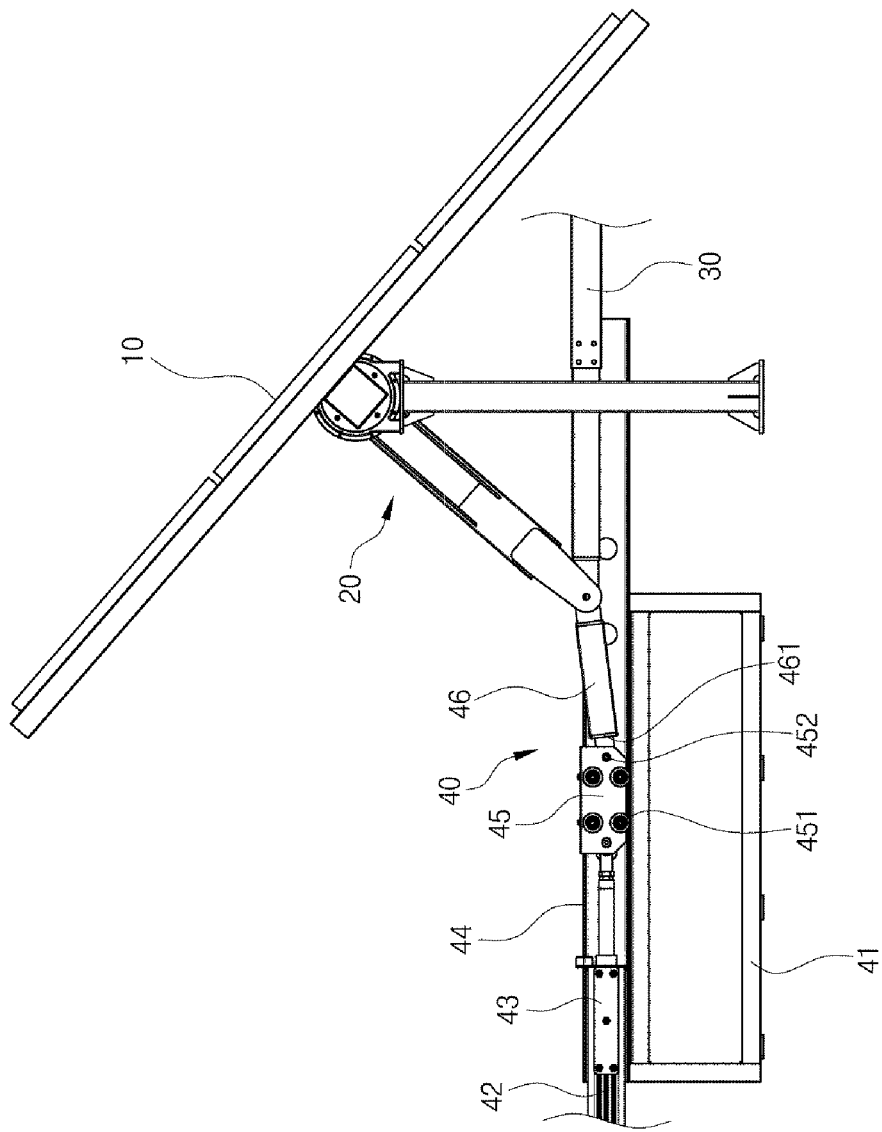
FIG. 3 is a side view showing a drive unit of the tracking photovoltaic generator according to the present invention.

FIG. 3 is a side view showing the drive unit of the tracking photovoltaic generator according to the present invention. FIG. 4 is a perspective view showing the drive unit of the tracking photovoltaic generator according to the present invention.

Figure 4:
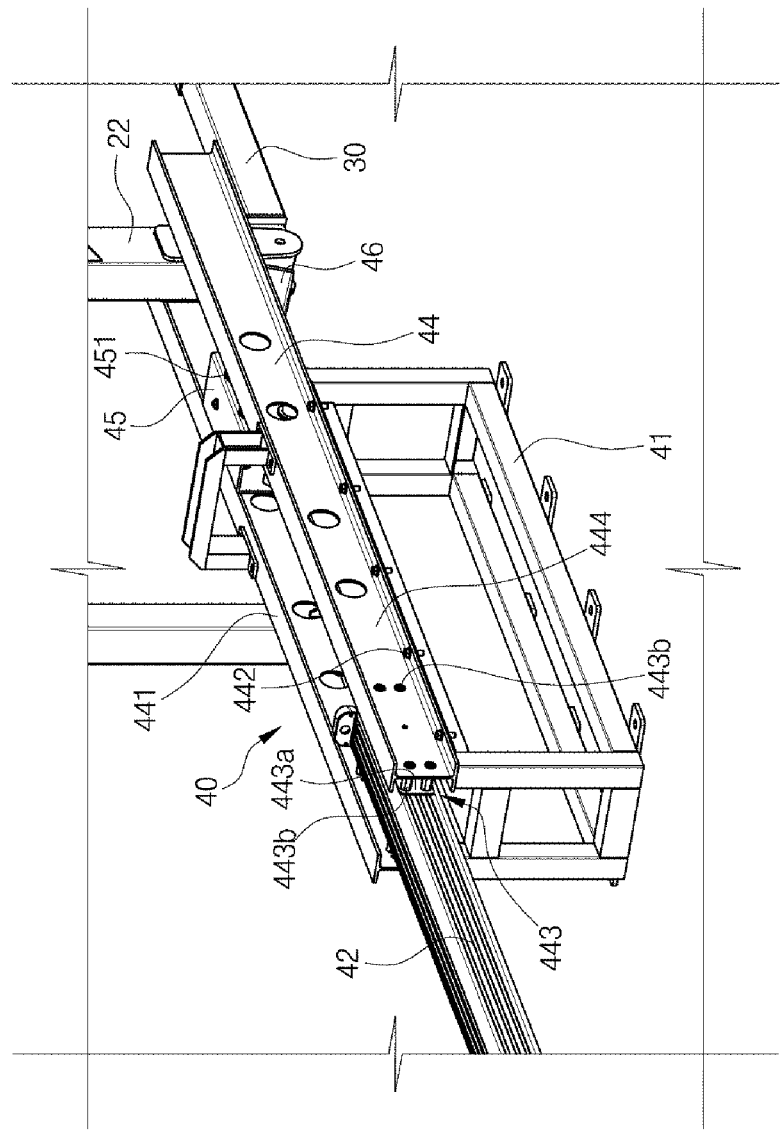
FIG. 4 is a perspective view showing the drive unit of the tracking photovoltaic generator according to the present invention.

Referring to FIGS. 3 and 4, the drive unit 40 includes a support table 41 that is placed on the ground and supports the actuator, a cylinder 42 that is provided on an upper surface of the support table 41 and generates linear drive force, a connection bracket 43 fixing the cylinder 42 in place, a bearing block 45 moving a linear direction, guide rails 44 that are provided on the upper surface of the support table 41 at positions spaced apart from each other and guide the bearing block 45 therebetween, and a link bar 46 coupled to the guide rails 44 so as to be rotatable upward or downward.

The cylinder 42 is an electric-powered cylinder and generates force for driving the bearing block 45 and the link bar 46.

The connection bracket 43 is coupled to a front end of the cylinder 42 so that the cylinder 42 can be fixed to the upper surface of the support table 41.

The guide rails 44, spaced apart from each other, are provided in a pair. Each guide rail 44 includes horizontal plates 441 that are respectively provided on upper and lower ends of the guide rail and extend in the horizontal direction, a guide wall plate 444 forming a wall surface between the horizontal plates 441, and a support means 443 that protrudes a front end of the guide rail to support a side surface of the cylinder 42.

In detail, the horizontal plates 441 respectively extend from the upper and lower ends of the guide wall plate 442 outward and toward the other guide rail 44. Particularly, extending outward, a portion of the lower horizontal plate 441 is brought into contact with the upper surface of the support table 41 and is fixed to the support table 41 by a fastening means 442 such as a screw.

The support means 443 includes a support plate 443b that is oriented upright and extends from the front end of the guide rail 44 rearward, and a support rod 443a that extends from the support plate 443b, passes through the side surface of the guide rail 44, and is fixed to the guide rail 44.

Extending from the front end of the guide rail 44 rearward, the support plate 443b is disposed adjacent to the cylinder 42 and is supported by the support rod 443a. The support plate 443b is brought into close contact with the side surface of the cylinder 42 or is spaced apart therefrom by a predetermined distance such that the cylinder 42 can be reliably supported between the guide rails 44.

The support rod 443a extends from the support plate 443b to the side surface of the guide rail 44, passes through the guide rail 44, and is fixed to the outer surface of the guide rail 44.

The bearing block 45 includes one or more rotating rollers 451 that are provided on each of opposite side surfaces of the bearing block 45 and rotate along the corresponding guide wall plate 444, and a hinge shaft 452 coupled to the link bar 46.

The one or more rotating rollers 451 are rotatably installed on each of the opposite surfaces of the bearing block 45. The rotating rollers 451 come into close contact with the inner surfaces of the horizontal plates 441 of the guide rails 44 and rotate along the horizontal plates 441 so that the bearing block 45 can move forward or backward.

The hinge shaft 452 is a shaft laterally fixed in the bearing block 45. A front end of the link bar 46 is coupled to the hinge shaft 452 so as to be rotatable upward or downward. The coupling structure between the hinge shaft 452 and the link bar 46 is a well known hinge structure, and detailed description and illustration thereof will be omitted.

As such, including the rotating rollers 451 and the hinge shaft 452, the bearing block 45 moves along the guide rails 44 forward or backward. Therefore, the drive force of the cylinder 42 can be prevented from being undesirably converted from linear motion into rotational motion.

One end of the link bar 46 is hinged to the bearing block 45, and the other end thereof is coupled to the connection bar 30. The cell support 20 is connected to a medial portion of the link bar 46. When the bearing block 45 moves forward, the link bar 46 transmits the force of the movement of the bearing block 45 to the connection bar 30, whereby the connection bar 30 is moved backwards. Simultaneously, the link bar 46 is rotated upward by the linear movement force applied from the bearing block 45 and, as shown in FIG. 3, is inclined upward with respect to the bearing block 45. When the bearing block 45 moves backward, the link bar 46 that has been inclined upward rotates around the hinge downward and positions itself parallel to the bearing block 45 while pulling the connection bar 30.

The reason for forming the above-mentioned construction is because it can absorb impact or vibrations generated on the connection bar 30 when force is applied from the cylinder 42 the connection bar 30 that has been in a stationary state.

The connection bar 30 and the cell support 20 will be explained with reference to FIGS. 5 and 6.

Figure 5:
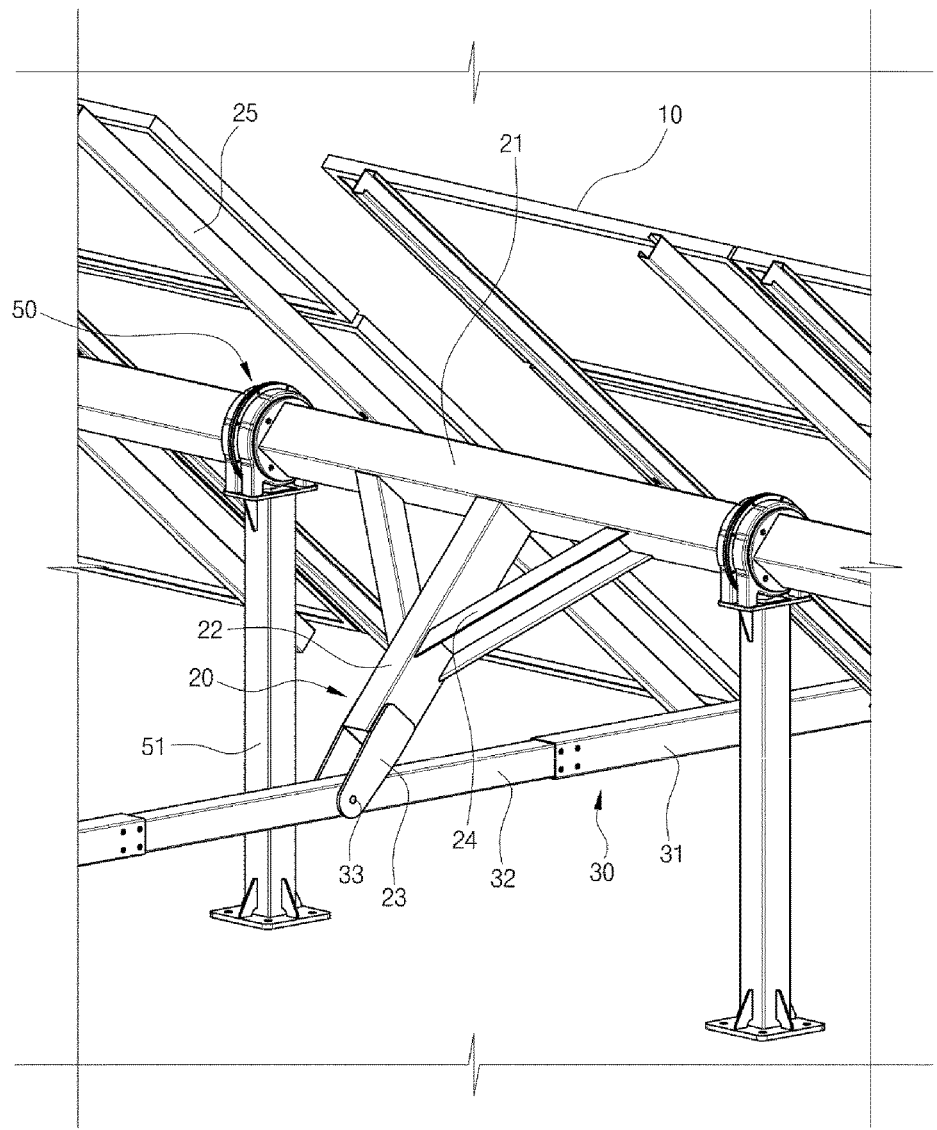
FIG. 5 is a perspective view showing a cell support of the tracking photovoltaic generator according to the present invention.
Figure 6:
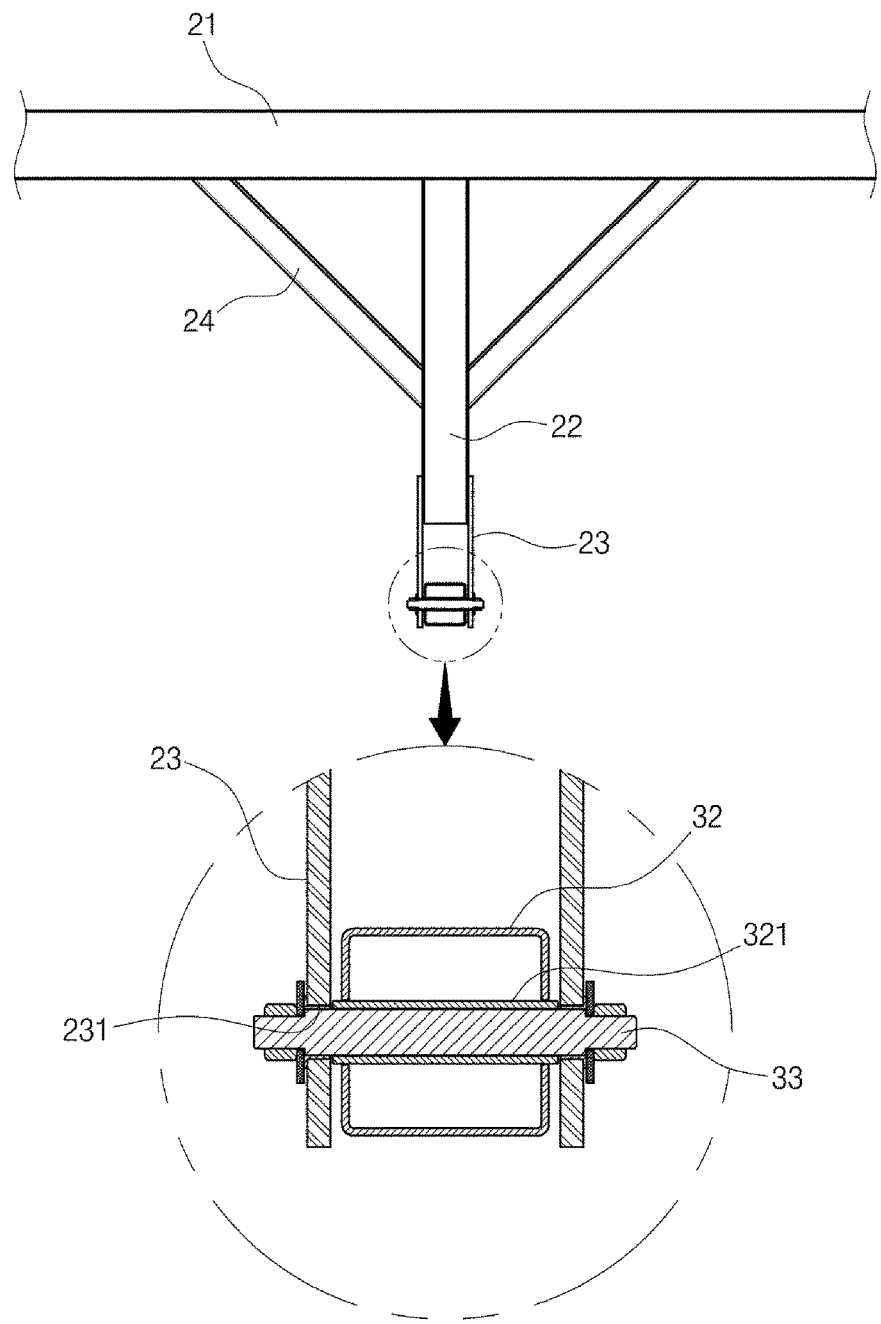
FIG. 6 is a front view showing the cell support of the tracking photovoltaic generator according to the present invention.

Referring to FIG. 5, the connection bar 30 is configured to extend in one direction by coupling pipes having different diameters to each other. The connection bar 30 includes first connection bars 31 and second connection bars 32 each having a smaller diameter than that of the first connection bar 31.

The first connection bar 31 and the second connection bar 32 are alternately connected to each other. Opposite ends of each second connection bar 32 are inserted into the corresponding first connection bars 31 and fixed thereto by a fastening means such as screws.

A corresponding one of the second connection bars 32 is connected to the link bar 46 and the cell support 20. Extending in the lateral direction of the second connection bars 32, a shaft insert member 321 is provided in each of the second connection bars 32 that are connected to the respective cell supports 20. The rotating shaft 33, by which the cell support 20 is coupled to the second connection bar 32, is inserted into the shaft insert member 321.

The shaft insert member 321 is a pipe extending in the lateral direction in the second connection bar 32. The shaft insert member 321 rotatably supports the rotating shaft 33.

The cell support 20 includes a turning shaft 21 that horizontally extends a predetermined length and is connected to one or more rotating units 50 to transmit rotating force thereto, a panel support frame 25 that extends in the longitudinal direction on an upper surface of the turning shaft 21 and supports the corresponding solar module 10, a vertical frame 22 extending downwards from the turning shaft 21 in a direction perpendicular to the turning shaft 21, a turning bracket 23 that is provided on a lower end of the vertical frame 22 and rotatably coupled to the corresponding second connection bar 32, and a diagonal frame 24 supporting the turning shaft 21.

In this embodiment, the turning shaft 21 extends to be connected to all of the rotating units 50 of the corresponding row and supports on an upper surface thereof one or more panel support frames 25. The turning shaft 21 converts linear moving force, transmitted from the vertical frame 22, into rotating force and transmits it to the rotating units 50. In detail, the turning shaft 21 extends in the lateral direction and is connected to the rotating units 50 arranged in a row at positions spaced apart from each other at regular intervals. The one or more panel support frames 25, which are arranged along each row, are fixed on the upper surface of the turning shaft 21. The solar modules 10 are installed on upper surfaces of the panel support frames 25. That is, the turning shaft 21 extends in one direction to support one or more solar modules 10 that are arranged in the same row. Furthermore, a single turning shaft 21 may be provided in each row or, alternatively, two or more turning shafts 21 are connected to each other on ends thereof so as to support the solar modules 10 arranged in the same row.

Supporting the solar modules 10, the panel support frames 25 are arranged on the upper surface of the turning shaft 21 at positions spaced apart from each other and extend in the longitudinal direction, for example, if the turning shaft 21 extends in the lateral direction.

The vertical frame 22 perpendicularly extends downwards from a lower surface turning shaft 21 and supports the turning shaft 21. The vertical frame 22 transmits linear moving force from the connection bar 30 to the turning shaft 21.

The diagonal frame 24 extends from the vertical frame 22 upwards at a predetermined angle and is fixed to the lower surface of the turning shaft 21, thus supporting the turning shaft 21. That is, the diagonal frame 24 supports to increase the strength of the turning shaft 21 to which the weight of the panel support frame 25 and the solar module 10 is applied.

The turning bracket 23 makes contact with opposite side surfaces of the second connection bar 32 and has a coupling hole 231 in a lower end thereof so that the turning bracket 23 is rotatably coupled to the second connection bar 32 by the rotating shaft 33. The upper end of the turning bracket 23 is fixed to the vertical frame 22, and the lower end thereof is rotatably coupled to the opposite side surfaces of the second connection bar 32 by the rotating shaft 33. Therefore, the turning bracket 23 rotates upward or downward when the connection bar 30 moves forward or backward.

The rotating unit 50 will be explained with reference to FIGS. 7 through 10.

Figure 7:
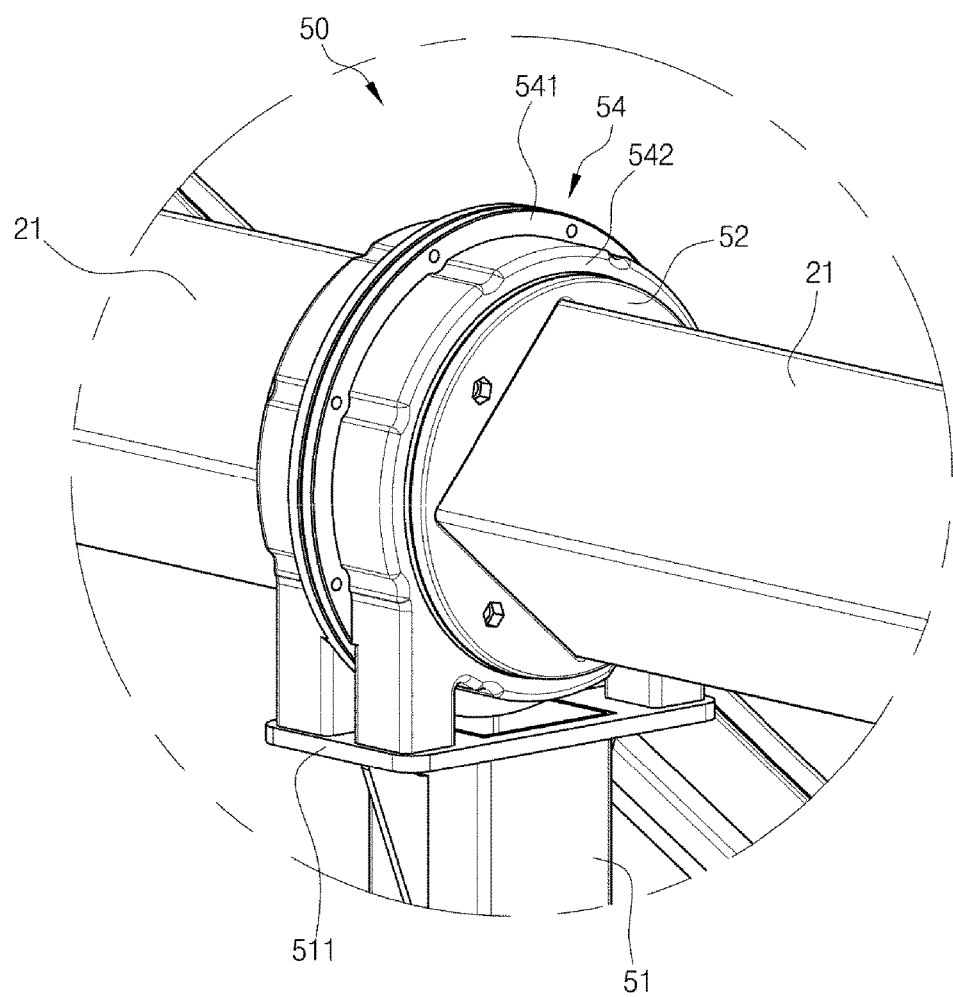
FIG. 7 is a perspective view showing a rotating unit of the tracking photovoltaic generator according to the present invention.

FIG. 7 is a perspective view showing the rotating unit of the tracking photovoltaic generator according to the present invention. FIG. 8 is a front view showing the rotating unit of the tracking photovoltaic generator according to the present invention. FIG. 9 is a sectional view taken along link A-A' of the rotating unit of the tracking photovoltaic generator according to the present invention. FIG. 10 is an exploded perspective view of the rotating unit of the tracking photovoltaic generator according to the present invention.

Referring to FIGS. 7 through 10, the rotating unit 50 includes a support post 51 that is fixed to the ground and has an upper planar plate 511 on an upper end thereof, holding plates 52 fixed to the turning shaft 21, a pair of coupling plates 54 fixed to the upper end of the support post 51, a rotator 56 rotating between the coupling plates 54, and rotating bearings 53 and gaskets 55 that are coupled to an outer surface of the rotator 56.

The gaskets 55, the rotating bearings 53 and the coupling plates 54 are successively coupled to the opposite side surface of the rotator 56. Each coupling plate 54 is a flange extending outward from the outer surface of the rotating unit 50. The coupling plates 54 are coupled to each other by tightening screws or the like into coupling parts 541 of the coupling plates 54 whereby the rotating bearing 53 and the gasket 55 coupled to the outer surface of the rotator 56 are fixed in place. The holding plates 52 are coupled to the respective front surface of the coupling plates 54 by screws. The holding plates 52 function to hold the turning shaft 21 passing through the rotator 56 and the coupling plates 54

As stated above, the turning shaft 21 is coupled to the rotating units 50 arranged in the same row and is rotated by the operation of the drive unit 40 so that the solar modules 10 arranged in the same row can be simultaneously rotated. That is, in the present invention, the multiple solar modules 10 are supported on each turning shaft 21, and the multiple rotating units 50 are connected to the single turning shaft 21. The solar modules 10 arranged in the same row can be rotated at the same time.

The support post 51 is a pillar protruding upward from the ground. The upper planar plate 511 is provided on the upper end of the support post 51.

Each coupling plate 54 includes a plate body 542 that is a circular body having an opening therein, a pair of support parts 543 extending downward from the plate body 542 to the upper surface of the support plate 443b, a coupling part 541 that is a plate protruding from the outer surface of the plate body 542 and has a plurality of screw holes 541a therein.

The coupling plates 54 are fitted over the opposite side parts of the rotator 56 in such a way that the support parts 543 are close to each other. Screws are tightened into the screws holes 541a formed in the coupling parts 541 that have been brought into close contact with each other. In this way, the rotator 56, the rotating bearings 53 and the gaskets 55 are fixed in place.

Preferably, the coupling plate 54 is configured such that grooves 542a are formed in the outer surface of the plate body at positions corresponding to the screw holes 541a of the coupling part 541 so as to facilitate screw tightening operation.

The rotator 56 includes a rotating body 561 having an opening therein. Forming a stepped portion, one or more coupling depressions 562 are formed in the outer surface of each of the opposite sides of the rotating body 561 so that the gaskets 55 and the rotating bearings 53 are placed on the rotating body 561 through the corresponding coupling depressions 562.

The gaskets 55 are seated onto the corresponding coupling depressions 562 of the rotator 56 and interposed and fixed between the opposite coupling parts 541. Each gasket 55 includes a gasket body 551 having an annular shape and has screw holes (not shown) corresponding the respective screw holes 541*a* of the coupling parts 541. The gasket 55 functions to seal space between the coupling parts 541 and enhance the coupling force between the coupling parts 541.

The rotating bearings 53 are respectively seated into the corresponding coupling depressions 562 at opposite sides of the rotator 56 and rotatably support the rotator 56. Each rotating bearing 53 has balls in an outer surface thereof at positions spaced apart from each other. The balls of the rotating bearing 53 make close contact with the rotator 56 and the inner surface of the coupling plate 54 while rotating.

Each holding plate 52 may be configured into a single body or divided into two or more parts. The holding plate 52 has in the central portion thereof the opening having a shape corresponding to that of the turning shaft 21. One or more screw holes 521 are formed in each holing plate 52 so that the holing plate 52 is fixed to a front surface of the corresponding coupling plate 54.

In an embodiment, the two holding plates 52 are respectively provided on front and rear surfaces of the rotator 56 and fastened to each other by fastening pins 571 inserted into the respective screw holes 521.

The rotating unit 50 is rotated by force transmitted from the holding plates 52 each having the opening corresponding to the shape of the turning shaft 21. In other words, when the turning shaft 21 rotates, the rotating force is transmitted to the holding plates 52 whereby the rotator 56 is rotated. Here, the coupling plates 54 are in a fixed state and support the rotator 56 and the holding plates 52 that rotate in conjunction with the turning shaft 21.

Hereinafter, the operation of the tracking photovoltaic generator according to the present invention having the above-mentioned construction will be described in detail with reference to FIG. 11.

FIG. 11 is a side view illustrating the operation of the tracking photovoltaic generator according to the present invention, in detail, showing a process of changing the orientation of the solar modules depending on the location of the sun.

FIG. 11*a* illustrates a condition in which the cylinder 42 is not in operation and the solar modules 10 convert solar energy into electric energy.

Thereafter, while the location of the sun varies over time, a sensor (not shown) senses the location of the sun, determines the direction in which the largest amount of light of the sun enters the solar modules 10, and then transmits it to the control unit (not shown). The control unit operates the cylinder 42 in response to the sensing signal of the sensor and thus rotates the solar modules 10. As shown in FIGS. 11*a*, 11*b* and 11*c*, the orientation of the solar modules 10 can be gradationally varied depending on the location of the sun over time.

Generally, methods of tracking the sun in tracking photovoltaic generators are classified into a method of using a sensor sensing the location of the sun and a method of operating the solar module 10 according to the time-based location of the sun. The present invention can use both the above-mentioned two kinds of methods. In addition, all techniques pertaining to controlling the solar modules 10 according to the location of the sun can be used.

The drive unit 40 is connected to any one of the connection bars 30 extending in the longitudinal direction. The connection bar 30 that is connected to the drive unit 40 is coupled to the corresponding cell supports 20 that are arranged in the longitudinal direction, whereby the cell supports 20 can rotate forward and backward.

Furthermore, each of the cell supports 20 that are coupled to the connection bar 30 connected to the drive unit 40 is connected by the turning shaft to the corresponding cell supports 20 arranged in the lateral direction.

Therefore, when the connection bar 30 connected to the drive unit 40 is operated, the cell supports 20 that are coupled to the connection bar 30 and arranged in the longitudinal direction are rotated forward or backward by the linear motion of the connection bar 30. Thereby, the turning shaft is rotated. As a result, the cell supports 20 that are laterally connected to the cell supports 20 that are coupled to the connection bar 30 connected to the drive unit 40 are rotated at the same time.

As the cell supports 20 that are arranged in the lateral direction are rotated, the rotating force of the cell supports 20 are converted into linear force and then applied to the connection bars 30 that are not connected to the drive unit 40. Thereby, all of the connection bars can be linearly moved.

In more detail, the cylinder 42 is operated under the control of the control unit according to the location of the sun. The force generated from the cylinder 42 moves the bearing block 45 forward or backward. Thereby, the bearing block 45 moves forward or backward and pushes or pulls the link bar 46. Then, the link bar 46 is moved forward or backward, and the connection bar 30 that is connected to the link bar 46 is also moved forward or backward.

Here, when pushing or pulling force is applied to the link bar 46 rotatably coupled to the bearing block 45, the link bar 46 pushes or pulls the connection bar 30 in an upwardly or downwardly inclined direction.

In the cell supports 20 coupled to the connection bar 30, when the turning brackets 23 are rotated, the vertical frames 22 are pulled forward. The turning shafts 21 are rotated by the forward rotation of the vertical frames 22. Here, each turning shaft 21 is connected both to the cell supports 20 arranged in the same row and to the rotating units 50 provided between the cell supports 20.

Therefore, force is evenly distributed to the cell supports 30 arranged, for example, in each of first, second and third rows, because the one or more turning shafts 21 are connected to the rotating units 50 provided between the cell supports 20 arranged in each row. Consequently, all of the solar modules 10 can be reliably rotated or stopped at the same time.

Preferably, the single turning shaft 21 may be provided in each row or, alternatively, the multiple turning shafts 21 connected to each other may be provided in each row and configured such that the turning shafts 21 can be rotated at the same time by respective drive units.

As described above, the present invention provides a tracking photovoltaic generator configured such that the orientation of a plurality of solar modules that faces the sun is varied according to the time-based location of the sun. The production and installation costs of the tracking photovoltaic generator according to the present invention are less than that of the conventional technique, and the photovoltaic power generation can be reliably conducted regardless of the location of the sun. Therefore, the present invention can be regarded as being very useful.

The invention claimed is:
1. A tracking photovoltaic generator, comprising:
    a drive unit outputting linear kinetic energy by operation of a linear actuator;

one or more solar modules converting solar energy into electric energy and outputting the electric energy;

one or more cell supports arranged in longitudinal and lateral directions, the one or more cell supports rotatably supporting the one or more solar modules;

a connection bar extending in the longitudinal direction and configured such that the one or more cell supports are rotatably connected to the connection bar, the connection bar being moved forward or backward by operation of the drive unit so that the one or more cell supports are rotated forward or backward;

turning shafts extending in the lateral direction, each of the turning shafts perpendicularly connecting the corresponding cell supports to each other, and one or more rotating units provided between the turning shafts, the one or more rotating units coupling the turning shafts in the lateral direction;

wherein each of the one or more rotating units comprises
a rotator comprising a rotating body having an opening therein so that each of the turning shafts is inserted into the rotating body, the rotating body having one or more coupling depressions formed in the rotating body along a circumference of the rotating body, the coupling depressions forming a stepped portion on which a gasket and a pair of rotating bearings seated, wherein, when the connection bar moves forward or backward, the turning shafts rotate and transmit rotating force to the cell supports connected to the turning shafts, and the rotator including the rotating body in which each turning shaft is inserted rotates so that the one or more cell supports arranged in the lateral direction and connected to each other are simultaneously rotated;

coupling plates each having an opening therein so that each of the turning shafts passes through the coupling plates, the coupling plates being coupled to each other at opposite sides of the rotator based on the gaskets and the pair of rotating bearings; and holding plates respectively coupled to front and rear portions of the coupling plates, each of the holding plates having in a central portion an opening corresponding to an outer shape of the turning shaft; and wherein the drive unit comprises:
a cylinder generating linear drive force;
guide rails spaced apart from each other to guide the cylinder, each of the guide rails comprising horizontal plates respectively provided on upper and lower ends of the guide rail and extending in opposite directions;
a bearing block comprising one or more rollers making close contact with the upper and lower horizontal plates of the guide rails and rotating along the horizontal plates and a hinge shaft at one end of the bearing block, the bearing block including the one or more rollers movable along the guide rails forward and backward by operation of the cylinder; and
a link bar having a first end connected to the connection bar and a second end rotatably coupled to the hinge shaft on which the link bar is rotated upward with respect to the bearing block when the bearing block moves forward, and on which the link bar that has been rotated upward is rotated downward when the bearing block moves backward.

2. The tracking photovoltaic generator of claim 1, wherein each of the one or more cell supports comprises:

one or more panel support frames fixed on an upper surface of the turning shaft, the one or more panel support frames supporting the corresponding one or more solar modules;

a vertical frame extending form a lower part of the turning shaft; and a turning bracket extending from a lower end of the vertical frame, the turning bracket being rotatably coupled to the connection bar.

3. The tracking photovoltaic generator of claim 2, wherein the one or more cell support further comprises
a diagonal frame extending upward from the vertical frame at a predetermined angle of inclination, the diagonal frame being fixed to the lower surface of the turning shaft.

4. The tracking photovoltaic generator of claim 1, wherein the connection bar comprises first connection bars and second connection bars alternately connected to each other, the first and second connection bars having different diameters.

5. The tracking photovoltaic generator of claim 2, wherein the connection bar further comprises
a rotating shaft provided in the connection bar and passing through opposite side surfaces of the connection bar, the rotating shaft rotatably coupling the turning bracket to the connection bar;
the turning bracket is rotatably coupled at an end thereof to the connection bar by the rotating shaft disposed in a through hole corresponding to a shaft insert member; and
the shaft insert member provided in the connection bar and configured to be closed at upper and lower sides by surfaces, the shaft insert member extending to openings formed in the opposite side surfaces of the connection bar so that the rotating shaft is inserted into the shaft insert member.

6. The tracking photovoltaic generator of claim 1, wherein each of the one or more rotating units further comprises
a support post placed upright on the ground, with an upper planar plate provided on an upper surface of the support post so that each of the one or more rotating units is supported on the support post.

7. The tracking photovoltaic generator of claim 1, wherein each of the coupling plates comprises:
a plate body having a shape corresponding to the rotator and having an opening in a central portion thereof;
a coupling part extending outward from the plate body, with one or more screw holes formed in the coupling part at positions spaced apart from each other; and
one or more grooves formed in an outer surface of the plate body at positions corresponding to the respective screw holes.

8. The tracking photovoltaic generator of claim 1, wherein the coupling plate further comprises
a support part extending downward from the plate body, the support part being fixed to an upper surface of the support post.

9. The tracking photovoltaic generator of claim 1, wherein the holding plate is divided into a plurality of parts and fastened to a front surface of the coupling plate.

10. The tracking photovoltaic generator of claim 1, wherein each of the one or more rotating units further comprises
a fastening pin inserted into the holding plates coupled to the respective opposite sides of the rotator so that the holding plates are fastened to each other by the fastening pin.

* * * * *